US011293823B2

(12) United States Patent
Schlachter et al.

(10) Patent No.: US 11,293,823 B2
(45) Date of Patent: Apr. 5, 2022

(54) METHOD FOR PRODUCING A PRESSURE TRANSMITTER SYSTEM

(71) Applicant: Endress+Hauser SE+Co. KG, Maulburg (DE)

(72) Inventors: Marc Andreas Schlachter, Wehr (DE); Stefan Kropf, Kleines Wiesen (DE); Dietmar Leuthner, Weil am Rhein (DE)

(73) Assignee: ENDRESS+HAUSER SE+CO. KG, Maulburg (DE)

( * ) Notice: Subject to any disclaimer, the term of this patent is extended or adjusted under 35 U.S.C. 154(b) by 354 days.

(21) Appl. No.: 16/345,883

(22) PCT Filed: Sep. 11, 2017

(86) PCT No.: PCT/EP2017/072774
§ 371 (c)(1),
(2) Date: Apr. 29, 2019

(87) PCT Pub. No.: WO2018/077523
PCT Pub. Date: May 3, 2018

(65) Prior Publication Data
US 2019/0277718 A1 Sep. 12, 2019

(30) Foreign Application Priority Data
Oct. 28, 2016 (DE) ..................... 10 2016 120 678.4

(51) Int. Cl.
*G01L 19/00* (2006.01)
*G21C 13/036* (2006.01)
*G01L 19/06* (2006.01)

(52) U.S. Cl.
CPC ...... *G01L 19/003* (2013.01); *F17C 2250/043* (2013.01); *G01L 19/0645* (2013.01); *G21C 13/036* (2013.01)

(58) Field of Classification Search
CPC ............ G01L 19/0046; G01L 19/0681; G01L 19/003; G01L 19/0007; G01L 19/04;
(Continued)

(56) References Cited

U.S. PATENT DOCUMENTS 8,371,179 B2    2/2013  Carton et al.
10,412,784 B2*  9/2019  Gerwig ................. H05B 1/023
(Continued)

FOREIGN PATENT DOCUMENTS

CN         1670420 A     9/2005
CN       201412622 Y     2/2010
(Continued)

OTHER PUBLICATIONS

Search Report for German Patent Application No. 10 2016 120 678.4, German Patent Office, dated Jun. 8, 2017, 6 pp.
(Continued)

*Primary Examiner* — Nimeshkumar D Patel
*Assistant Examiner* — Gedeon M Kidanu
(74) *Attorney, Agent, or Firm* — Christopher R. Powers; Endress+Hauser (USA) Holding Inc.

(57) ABSTRACT

The present disclosure relates to a method for producing a pressure transmitter system, comprising the steps: providing a protective hose, a capillary tube and a pressure transmitter, which consists of a membrane support body and a filling adapter body that has a filling closure; arranging the capillary tube and a capillary interface of the capillary adapter relative to one another; integrally welding the capillary tube to the capillary adapter; and placing the protective hose onto a protective hose mounting of said capillary adapter.

19 Claims, 4 Drawing Sheets

(58) Field of Classification Search
CPC . G01L 19/06; G01L 19/0618; G01L 19/0645; G01L 13/026; G01L 19/0609; G01L 19/0627; G01L 27/007; G01L 7/082; G01L 19/0084; G01L 19/0663; G01L 19/141; G01F 23/284; G21C 13/036; G21C 17/00; G21D 1/04; F17C 2250/043; F28F 13/00; F28F 2013/008; Y02E 30/30; Y10T 29/49815; H01R 29/00

See application file for complete search history.

(56) References Cited

U.S. PATENT DOCUMENTS

| | | | |
|---|---|---|---|
| 2005/0225035 A1* | 10/2005 | Sundet | G01L 19/0046 277/590 |
| 2006/0128199 A1* | 6/2006 | Hedtke | G01D 11/24 439/320 |
| 2013/0202475 A1 | 8/2013 | Smaglinski et al. | |
| 2015/0020600 A1* | 1/2015 | Eriksen | G01L 19/06 73/706 |
| 2015/0258262 A1 | 9/2015 | Pfeffer et al. | |
| 2017/0227412 A1* | 8/2017 | Becher | G01L 19/0681 |
| 2019/0277719 A1* | 9/2019 | Schlachter | G01L 19/0618 |

FOREIGN PATENT DOCUMENTS

| | | |
|---|---|---|
| CN | 204556155 U | 8/2015 |
| CN | 104977120 A | 10/2015 |
| CN | 105671394 A | 6/2016 |
| DE | 1665749 U | 10/1953 |
| DE | 102005012437 A1 | 10/2005 |
| DE | 102014005409 A1 | 10/2015 |
| DE | 102014110615 A1 | 1/2016 |
| WO | 2016091481 A1 | 6/2016 |

OTHER PUBLICATIONS

International Search Report for Patent Application No. PCT/EP2017/072774, WIPO, dated Mar. 5, 2018, 21 pp.

* cited by examiner

METHOD FOR PRODUCING A PRESSURE TRANSMITTER SYSTEM

CROSS-REFERENCE TO RELATED APPLICATIONS

The present application is related to and claims the priority benefit of German Patent Application No. 10 2016 120 678.4, filed on Oct. 28, 2016 and International Patent Application No. PCT/EP2017/072774, filed on Sep. 11, 2017, the entire contents of which are incorporated herein by reference.

TECHNICAL FIELD

The invention relates to a method for producing a pressure transmitter system and to a pressure transmitter system.

BACKGROUND

Pressure transmitter systems for transmitting a media pressure usually comprise at least one, three-part pressure transmitter, a capillary tube, and a protective hose. The three-part pressure transmitter comprises a capillary adapter, a filling adapter and a membrane support body with a media-side surface, and a separating membrane which is connected to the pressure transmitter body in a gas-tight manner along at least one edge while forming a pressure chamber between the separating membrane and the pressure transmitter body, wherein a channel extends from the pressure chamber through the pressure transmitter, and the pressure chamber and the channel are filled with a transmission fluid in order to transmit to a pressure receiver a media pressure prevailing at the separating membrane via the filling adapter, the capillary adapter, and the capillary tube. For this purpose, the capillary tube is connected via the capillary adapter to the membrane support body in order to transmit the media pressure to the pressure receiver—for example, a pressure transmitter.

In order to produce such a pressure transmitter system, a complex and expensive production process is required. In this case, the capillary tube is first introduced into a through-hole of the capillary adapter until it is substantially flush with an end face of the capillary adapter. The capillary tube is subsequently welded to the capillary adapter at this end face before the adapter with the capillary tube is fixed to the filling adapter. The capillary adapter with the capillary tube is subsequently fixed to the filling adapter and requires manual and thus complex repositioning of the capillary tube during the welding on account of the capillary tube already welded thereto.

In the next step, a protective hose is pulled over the capillary tube and guided on one side into a bore of the capillary adapter, which extends up to a defined depth in the longitudinal direction of the capillary adapter and opens into the through-hole. The protective hose introduced into the recess in this way is subsequently fixed to the capillary adapter. As already indicated, this production process has the disadvantage that it is relatively complex and thus also expensive.

Furthermore, pressure transmitter systems produced in this way have poor resistance to corrosion-promoting ambient conditions, since the weld seam between the capillary adapter and the capillary tube is not accessible for reworking, so that corrosion formation increasingly occurs. This in turn leads to an oil leakage ultimately occurring at the corroded point.

Another disadvantageous aspect of pressure transmitters produced in this way is that, as a result of the bore of the capillary adapter into which the protective hose is introduced, a kind of collecting function for liquids, e.g., rainwater, and thus in turn increased corrosion formation occurs in the transition region of the bore and the through-hole.

SUMMARY

It is an aim of the invention to specify a simplified and more cost-effective method for producing a pressure transmitter system, and a pressure transmitter system that is easier and more cost-effective to produce and has an increased life expectancy.

The aim is achieved according to the invention by a method for producing a pressure transmitter system and by a pressure transmitter system.

With regard to the method, the aim is achieved by a method for producing a pressure transmitter system comprising the following steps:

Providing a protective hose, a capillary tube, and a pressure transmitter, wherein the pressure transmitter consists of a membrane support body and a filling adapter body, wherein the membrane support body comprises, at a first end, a separating membrane which is connected to the membrane support body in a gas-tight manner along at least one edge while forming a pressure chamber between the separating membrane and the membrane support body, and is joined at a second end to a first end of the filling adapter body, wherein the filling adapter body has, at a second end, a first capillary interface for hydraulically connecting the capillary tube, wherein the first capillary interface is designed in such a way that the capillary tube can be introduced into the first capillary interface up to a predetermined depth and closely surrounds the capillary tube, wherein the pressure transmitter further has an inner connecting oil path extending from the pressure chamber to the first capillary interface so that the pressure chamber can be connected hydraulically from the first capillary interface, wherein the capillary tube is introduced into the first capillary interface and is welded to the filling adapter body, wherein the first capillary interface further has a protective hose mounting designed in such a way that the protective hose can be closely placed externally over the protective hose mounting and wherein the filling adapter body has a filling closure for filling the pressure transmitter system with a pressure transmission fluid;

Placing the capillary tube in relation to the first capillary interface of the pressure transmitter;

Bonding the capillary tube firmly to the first capillary interface by welding;

Placing the protective hose onto the protective hose mounting of the first capillary interface.

The invention proposes a production process, wherein the sequence of the welding processes has been altered in such a way that the pressure transmitter system can be formed from the inside. Since the weldings are typically carried out in a protective gas atmosphere, tempering colors and scalings in the interior of the capillary tube can be prevented. Moreover, corrosion protection is improved from the outside by the protective gas cover. The constructive redesign also prevents an environmental medium, such as rainwater, from accumulating in critical areas susceptible to corrosion.

An advantageous embodiment of the method according to the invention provides that the protective hose, after placing it on the capillary adapter, be fixed thereto at least in places, in particular by welding.

An alternative embodiment of the method according to the invention provides that the protective hose be fixed to the pressure transmitter by means of pressing.

A further advantageous embodiment of the method according to the invention provides that the welding of the capillary tube to the first capillary interface be carried out by means of an orbital-, TIG-, or laser-welding process.

A further advantageous embodiment of the method according to the invention provides that, when providing the pressure transmitter, the first capillary interface be designed in such a way that it has a first stop, so that the capillary tube can be introduced into the filling adapter body up to the first stop.

An alternative embodiment of the method according to the invention provides that the arrangement of the capillary tube and the first capillary interface relative to one another, as well as the welding, take place in abutment.

A further advantageous embodiment of the method according to the invention provides that the protective hose be placed onto the protective hose mounting up to an outer stage which is provided at the second end of the pressure transmitter when the pressure transmitter is provided.

With respect to the pressure transmitter system, the aim is achieved by a pressure transmitter system having a pressure transmitter, a capillary tube, and a protective hose, wherein the pressure transmitter consists of a membrane support body and a filling adapter body, wherein the membrane support body comprises, at a first end, a separating membrane which is connected to the membrane support body in a gas-tight manner along at least one edge while forming a pressure chamber between the separating membrane and the membrane support body, and is joined at a second end to a first end of the filling adapter body, wherein the filling adapter body has, at a second end, a first capillary interface for hydraulically connecting the capillary tube, wherein the first capillary interface is designed in such a way that the capillary tube can be introduced into the first capillary interface up to a predetermined depth and closely surrounds the capillary tube, wherein the pressure transmitter further has an inner connecting oil path extending from the pressure chamber to the first capillary interface so that the pressure chamber can be connected hydraulically from the first capillary interface, wherein the capillary tube is introduced at the end into the first capillary interface and is welded to the filling adapter body, wherein the first capillary interface further has a protective hose mounting designed in such a way that the protective hose can be closely placed externally over the protective hose mounting and wherein the filling adapter body has a filling closure for filling the pressure transmitter system with a pressure transmission fluid.

An advantageous embodiment of the pressure transmitter system according to the invention provides that the filling adapter body comprise at the second end an outer first shoulder as a stop for the protective hose as part of the protective hose mounting. In particular, the embodiment can provide that the protective hose be inserted into the protective hose mounting and be fixed to the filling adapter body at least in places, in particular by welding or by means of pressing.

A further advantageous embodiment of the pressure transmitter system according to the invention provides that the filling adapter body comprise, at the second end at the transition to the oil path, an inner second shoulder as a stop for the capillary tube as part of the first capillary interface.

A further advantageous embodiment of the pressure transmitter system according to the invention provides that the first capillary interface have a substantially constant inner diameter and extend up to a stage of the second shoulder. In particular, the embodiment provides that the inner diameter of the first capillary interface be selected such that it substantially corresponds to an outer diameter of the capillary tube so that the capillary tube is closely surrounded by the first capillary interface.

A further advantageous embodiment of the pressure transmitter system according to the invention further has a pressure transmitter and a pressure transmitter adapter, wherein the pressure transmitter adapter has a second capillary interface via which the capillary tube is welded at the end to the pressure transmitter adapter, wherein the second capillary interface is designed substantially identically to the first capillary interface. The embodiment can, in particular, provide that the pressure transmitter adapter have a filling closure. An alternative embodiment of the pressure transmitter system according to the invention provides that the capillary tube be welded to the pressure transmitter adapter via the second capillary interface by means of an orbital-, TIG-, or laser-welding process.

BRIEF DESCRIPTION OF THE DRAWINGS

The invention is explained in more detail based upon the following drawings. The following are shown.

DETAILED DESCRIPTION

Figure 1:
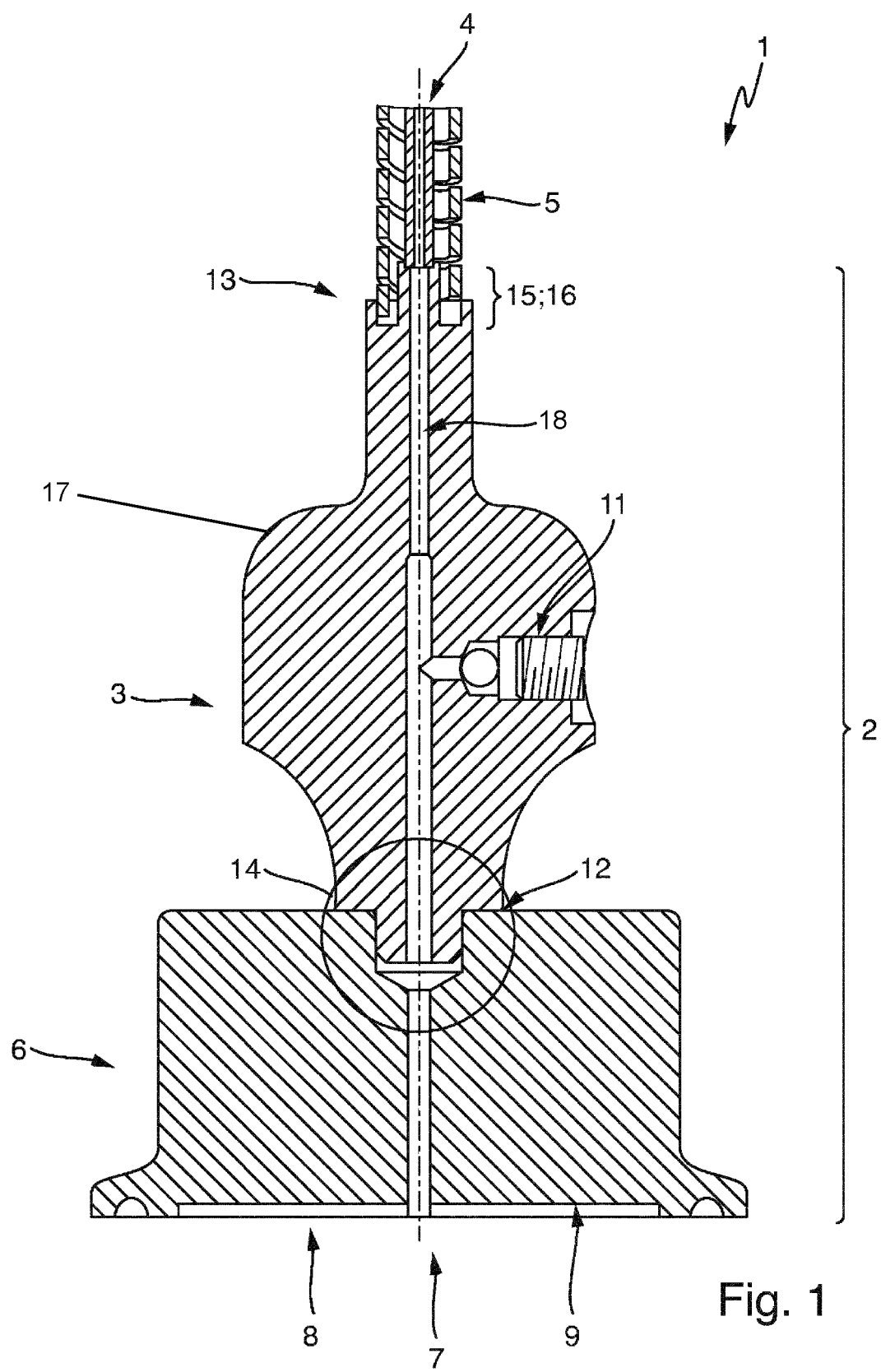
FIG. 1 shows a cross-sectional view of a pressure transmitter system according to the invention, which comprises a pressure transmitter, a capillary tube, and a protective hose.

FIG. 1 shows a cross-sectional view of a pressure transmitter system 1 according to the invention, which comprises a pressure transmitter 2, a capillary tube 4, and a protective hose 5.

The pressure transmitter 2 consists of a metallic membrane support body 6, which is manufactured as a rotary part, e.g., from a piece of stainless steel, and is essentially axially symmetrical, and a filling adapter body 3.

The metallic membrane support body 6 has a media-side surface 7 and a separating membrane 8, which is connected to the membrane support body 6 in a gas-tight or pressure-resistant manner along at least one edge while forming a pressure chamber 9 between the separating membrane 8 and the membrane support body 6. The filling adapter body 3 likewise comprises a metallic base body 17 which has a first side 12 and a second side 13 opposite the first side 12. The filling adapter body 3 is also typically manufactured as a rotary part so that its outer contour is essentially axially symmetrical or rotationally symmetrical. Into the filling adapter body 3, an inner connecting oil path 18 is introduced, which extends in the longitudinal direction from the first side 12 to the second side 13 through the filling adapter body 3. The oil path 18 can be produced, for example, by a bore, and thus in the form of an inner capillary line.

Figure 2B:
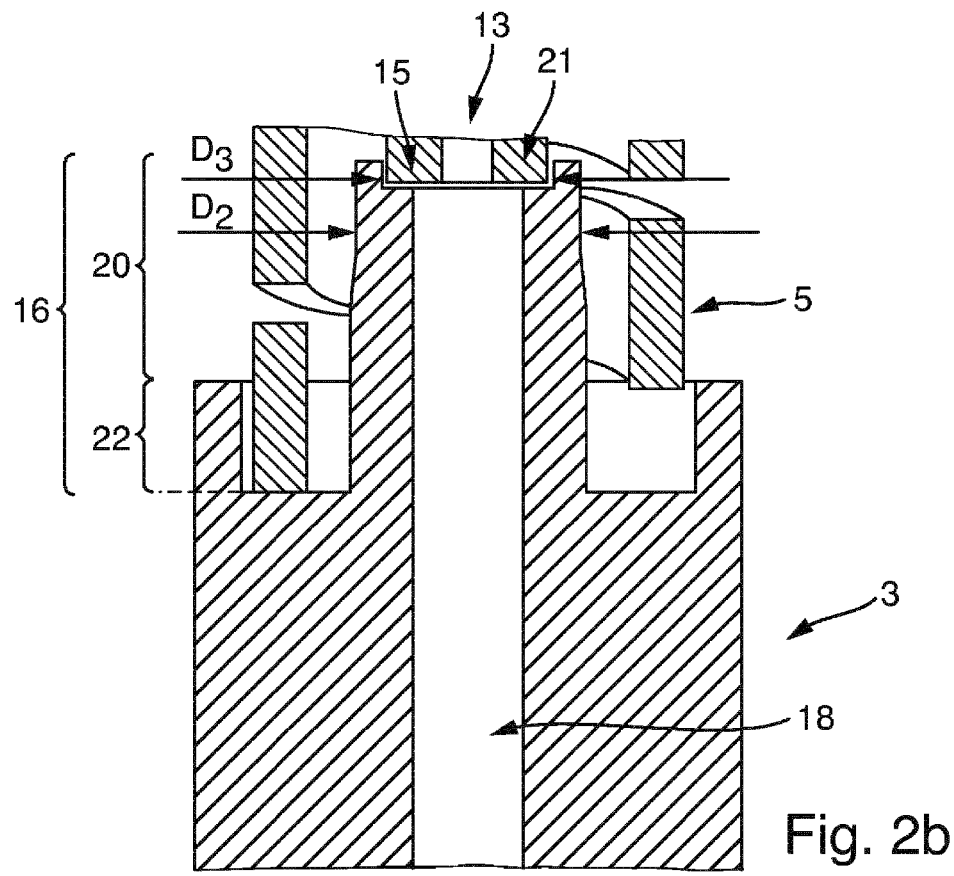
FIGS. 2a and 2b show a cross-sectional view of the filling adapter body, wherein only the two edge regions are shown.
Figure 2A:
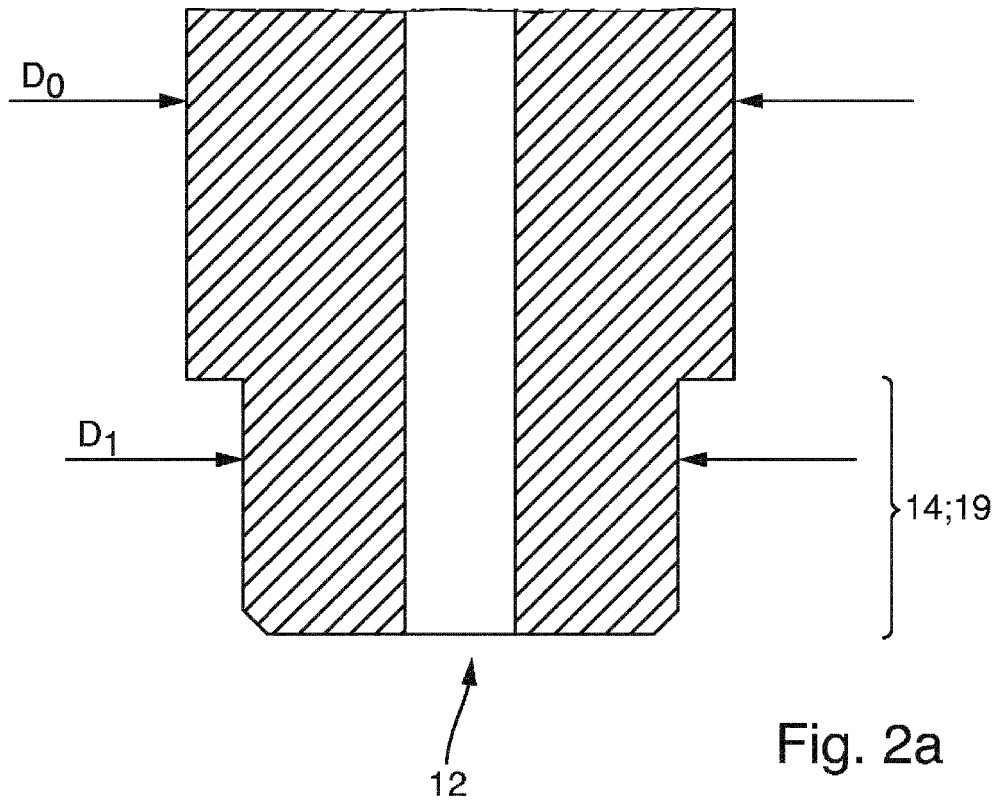

As shown in FIG. 2a, the filling adapter body 3 comprises on the first side 12 a membrane support connector 14, e.g., in the form of a rotated first shoulder 19 having a first diameter $D_1$. With the membrane support connector 14, the filling adapter body 3 engages in the membrane support body 6, which has a recess corresponding to the first diameter $D_1$ of the first shoulder 19. The first shoulder 19 and the recess are thereby matched to one another and formed in such a way that the first shoulder 19 can be inserted or introduced closely into the recess. The filling adapter body 3 is welded to the membrane support body 6 via the membrane support connector 14.

As shown in FIG. 2b, the filling adapter body 3 has a capillary interface 15 on the second side 13 opposite the first side 12. This capillary interface 15 is formed in the shape of a capillary tube opening having a third diameter D3, wherein the inner oil path or the capillary line 18 opens into the capillary tube opening. The capillary interface 15 is preferably designed such that an inner third shoulder 21 in the form of an inner stage is formed at a transition between the inner oil path or the capillary line 18 and the capillary tube opening. The inner stage serves in this case as a stop for the capillary tube 4 during the assembly of the pressure transmitter system. Accordingly, the depth of the capillary tube opening can be used to define the immersion depth of the capillary tube in the filling adapter body 3 during assembly. The immersion depth is preferably selected such that the capillary tube 4 can be inserted only partially into the filling adapter body 3 and the capillary tube 4 does not, as is known from the prior art, for example, completely pass through the filling adapter body 3. Furthermore, the capillary interface 15 has a substantially constant diameter D3. The inner diameter D3 is selected such that the capillary tube 4 can be inserted tightly into the capillary tube opening 15.

As shown in FIG. 2b, the capillary interface 15 or the filling adapter body 3 comprises a protective hose mounting 16 which is designed such that the protective hose 5 (shown only rudimentarily in FIG. 2) can be placed externally over the protective hose mounting 16. For this purpose, the protective hose mounting 16 preferably has an outer second shoulder 20 with a second diameter $D_2$. The diameter $D_2$ is selected such that the protective hose 5 can be closely placed externally over the protective hose mounting 16. Furthermore, the protective hose mounting 16 has an annular recess 22 which is inserted between an outer surface of the filling adapter body 3 and the inner oil path and serves to receive the protective hose 5.

The filling adapter body 3 has a filling closure 11 (not shown in FIGS. 2a and 2b) for filling the pressure transmitter system 1 with a pressure transmission fluid 10 and can likewise be manufactured as a rotary part, and thus also be essentially axially symmetrical. With regard to the choice of the material, stainless steel has also proven to be advantageous. The membrane support body 6 and the filling adapter body 3 are joined together and together form the pressure transmitter 2.

The filling adapter body 3 can comprise a filling closure 11 via which the pressure transmission fluid 10 can be filled. The filling closure 11 may be closed via a closure element, such as a ball or a screw.

Figure 3:
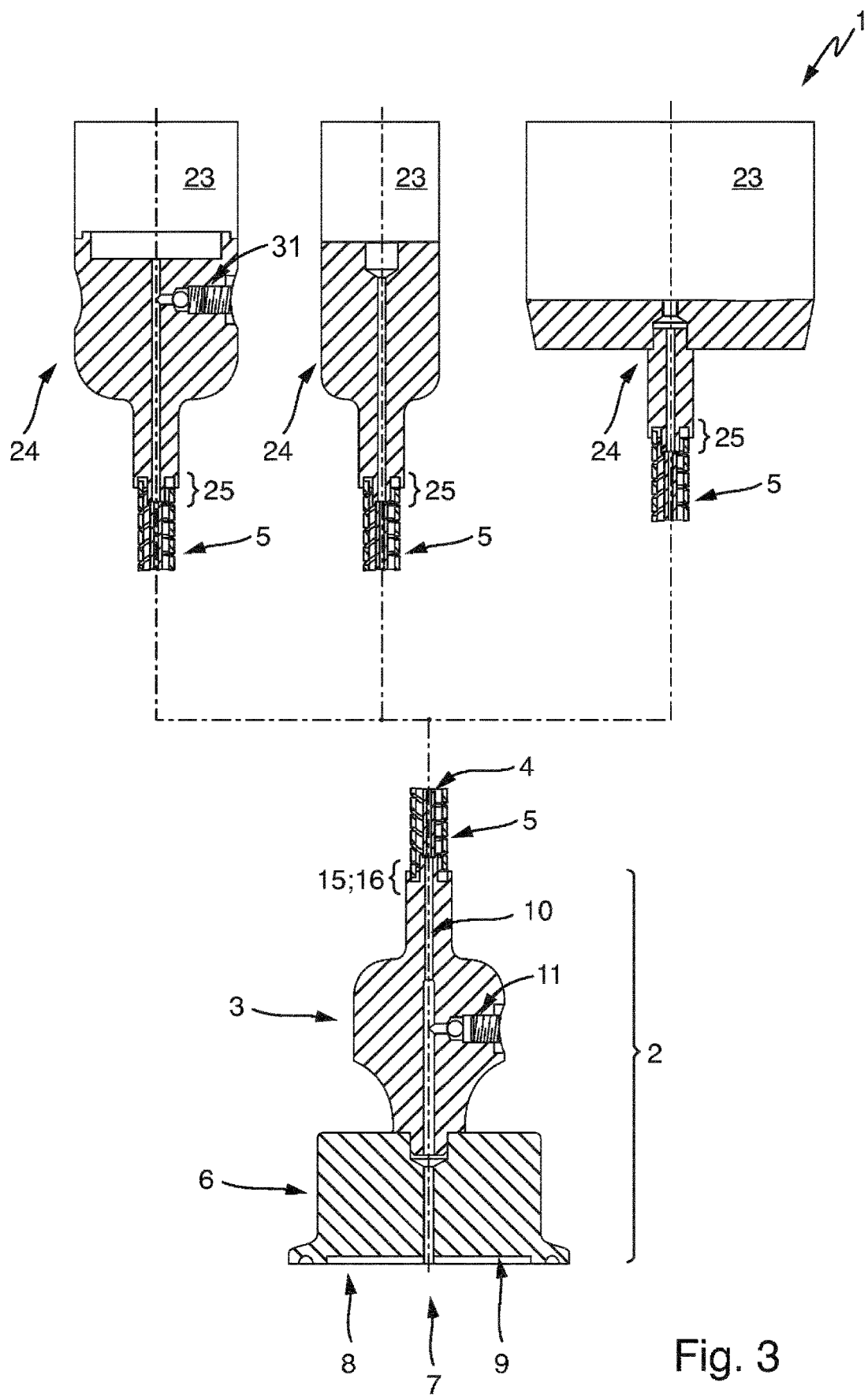
FIG. 3 shows a cross-sectional view of the pressure transmitter system, extended by a pressure transmitter and a pressure transmitter adapter.

FIG. 3 shows a cross-sectional view of the pressure transmitter system 1, extended by a pressure transmitter 23 and a pressure transmitter adapter 24. The pressure transmitter adapter 24 has a further capillary interface 25. Via this capillary interface 25, the capillary tube 4 is welded at the end to the pressure transmitter adapter 24 so that, in the filled state of the pressure transmitter system 1, a pressure applied on the process side to the separating membrane 8 can be passed to the pressure transmitter 23, and the latter can determine a pressure. The capillary interface 25 of the pressure transmitter adapter 24 is preferably mechanically designed substantially identically to the capillary interface 15 of the filling adapter body 3 located at the other end of the capillary tube 4. In particular, the capillary tube 4 is also welded in this case to the pressure transmitter adapter 24 by an orbital-, TIG-, or laser-welding process. Furthermore, the pressure transmitter adapter 24 can provide a filling closure 31 for filling the pressure transmitter system 1 with the transmission fluid.

Figure 4:
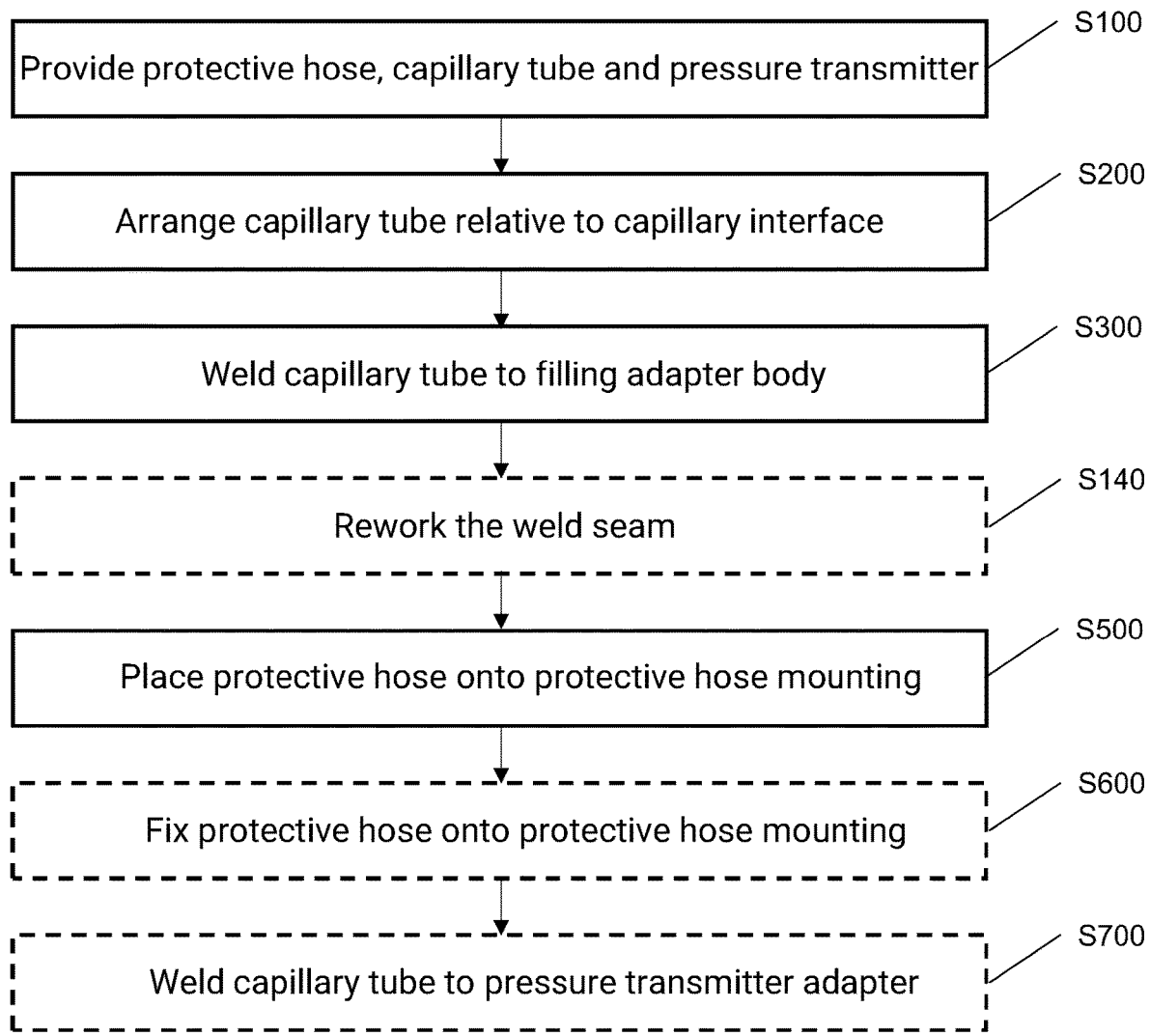
FIG. 4 shows an exemplary method sequence of the method according to the invention.

FIG. 4 shows an exemplary method sequence of the method according to the invention for producing the pressure transmitter system, which provides the following steps:

In the first method step S100, the protective hose, the capillary tube, and the pressure transmitter are provided. The pressure transmitter is produced in this case from two parts—the membrane support body and the filling body support. These parts are preferably produced in the form of rotary parts from a metallic material, e.g., stainless steel, as described above.

In the second method step S200, the capillary tube 4 and the capillary interface 15 are arranged relative to one another. In this case, a variant can provide that the capillary tube 4 be introduced into the capillary tube opening as capillary interface 15. As described above, the capillary tube 4 is thereby introduced as a stop into the capillary tube opening up to the inner stage. In an alternative variant, the capillary tube 4 and the capillary interface 15 are arranged in abutment against one another.

In the third method step S300, the capillary tube 4 is welded to the filling adapter body 3 in a firmly-bonded manner. This is preferably carried out by means of an orbital-, TIG-, or laser-welding process. In the event that the capillary tube 4 and the capillary interface are arranged in abutment, welding also takes place in abutment.

Due to the external weld seam, it can be reworked in a fourth step S400 which follows the fourth method step, but is optional. Tempering colors developed during welding can thus be reduced, for example. The reworking of the weld seam results in a less corrosion-susceptible surface in the region of the weld seam.

In the fifth method step S500, the protective hose 5 is placed onto the protective hose mounting 16 of the filling adapter body 3 and is preferably introduced into the annular recess.

In the sixth, again optional, method step S600, after the protective hose is placed onto the protective hose mounting, the protective hose is fixed. This may be done by spot welding, for example, wherein at least one welding spot, and preferably several welding spots, are made. Alternatively, the fixing can also be realized by pressing.

In the seventh, likewise optional, method step S700, the capillary tube is welded via the further interface of the pressure transmitter adapter to the pressure transmitter adapter, preferably by an orbital-, TIG-, or laser-welding process.

The invention claimed is:

1. A method for producing a pressure transmitter system, the method comprising:
providing a protective hose, a capillary tube, and a pressure transmitter, wherein the pressure transmitter includes a membrane support body and a filling adapter body, wherein the membrane support body includes, at a first end, a separating membrane connected to the membrane support body in a gas-tight manner along at least one edge, while forming a pressure chamber between the separating membrane and the membrane support body, and is joined, at a second end, to a first end of the filling adapter body, wherein the filling adapter body includes, at a second end, a first capillary interface for hydraulically connecting the capillary tube, wherein the first capillary interface is configured such that the capillary tube can be introduced into the first capillary interface to a set depth such that the first capillary interface closely surrounds the capillary tube, wherein the pressure transmitter further includes an inner connecting oil path extending from the pressure chamber to the first capillary interface such that the pressure chamber is connected hydraulically to the first capillary interface, wherein the first capillary interface further includes a protective hose mounting configured such that the protective hose can be closely placed externally over the protective hose mounting, and wherein the filling adapter body has a filling closure for filling the pressure transmitter system with a pressure transmission fluid;

introducing the capillary tube into the first capillary interface of the pressure transmitter to a set depth such that the first capillary interface closely surrounds the capillary tube;

welding the capillary tube to the first capillary interface; and placing the protective hose onto the protective hose mounting of the first capillary interface.

2. The method of claim 1, wherein the capillary tube is welded to the first capillary interface using an orbital, tungsten inert gas (TIG), or laser welding process.

3. The method of claim 1, wherein the first capillary interface includes a first stop configured such that the capillary tube can be introduced into the filling adapter body to the first stop.

4. The method of claim 1, wherein the capillary tube and the first capillary interface are disposed relative to one another in abutment during and after the welding.

5. The method of claim 1, wherein the protective hose mounting of the pressure transmitter includes an outer stage adjacent the first capillary interface, and wherein the protective hose is placed onto the protective hose mounting to the outer stage.

6. The method of claim 1, further comprising fixing the protective hose to the pressure transmitter after placing the protective hose onto the protective hose mounting.

7. The method of claim 6, wherein the protective hose is fixed to the pressure transmitter, at least in stops, by welding.

8. The method of claim 6, wherein the protective hose is fixed to the pressure transmitter by a pressing operation.

9. A pressure transmitter system, comprising:
a pressure transmitter including a membrane support body and a filling adapter body, wherein the membrane support body includes, at a first end, a separating membrane connected to the membrane support body in a gas-tight manner along at least one edge, while forming a pressure chamber between the separating membrane and the membrane support body, and joined at a second end to a first end of the filling adapter body;
a capillary tube, wherein the filling adapter body includes, at a second end, a first capillary interface for hydraulically connecting the capillary tube to the filling adapter, the first capillary interface configured such that the first capillary interface fits snugly around the capillary tube when the capillary tube is introduced into the first capillary interface to a set depth, and wherein the pressure transmitter further includes an inner connecting oil path extending from the pressure chamber to the first capillary interface, connecting the pressure chamber hydraulically to the first capillary interface; and
a protective hose, wherein the first capillary interface further includes a protective hose mounting configured such that the protective hose fits closely externally over the protective hose mounting,
wherein the filling adapter body includes a first filling closure configured to enable filling the pressure transmitter system with a pressure transmission fluid, and wherein the capillary tube is introduced at the end into the first capillary interface and is welded to the filling adapter body.

10. The pressure transmitter system of claim 9, wherein the filling adapter body includes, at the second end as part of the protective hose mounting, an outer first shoulder upon which the protective hose stops.

11. The pressure transmitter system of claim 9, wherein the filling adapter body includes, at the second end at the transition to the oil path, an inner second shoulder configured as a stop for the capillary tube as part of the first capillary interface.

12. The pressure transmitter system of claim 9, wherein the first capillary interface has a substantially constant inner diameter and extends at least to a level of the second shoulder.

13. The pressure transmitter system of claim 12, wherein the inner diameter of the first capillary interface substantially corresponds to an outer diameter of the capillary tube such that the capillary tube is closely surrounded by the first capillary interface.

14. The pressure transmitter system of claim 9, wherein the protective hose is inserted into the protective hose mounting and is fixed to the filling adapter body at least in places.

15. The pressure transmitter system of claim 14, wherein the protective hose is fixed to the filling adapter body at least in places by welding.

16. The pressure transmitter system of claim 14, wherein the protective hose is fixed to the filling adapter body at least in places by pressing.

17. The pressure transmitter system of claim 9, further comprising a pressure transmitter adapter, the pressure transmitter adapter including a second capillary interface via which the capillary tube is welded at an end to the pressure transmitter adapter,
wherein the second capillary interface is configured substantially identically to the first capillary interface.

18. The pressure transmitter system of claim 17, wherein the pressure transmitter adapter includes a second filling closure.

19. The pressure transmitter system of claim 17, wherein the capillary tube is welded to the pressure transmitter adapter via the second capillary interface using an orbital, TIG, or laser welding process.

* * * * *